United States Patent Office

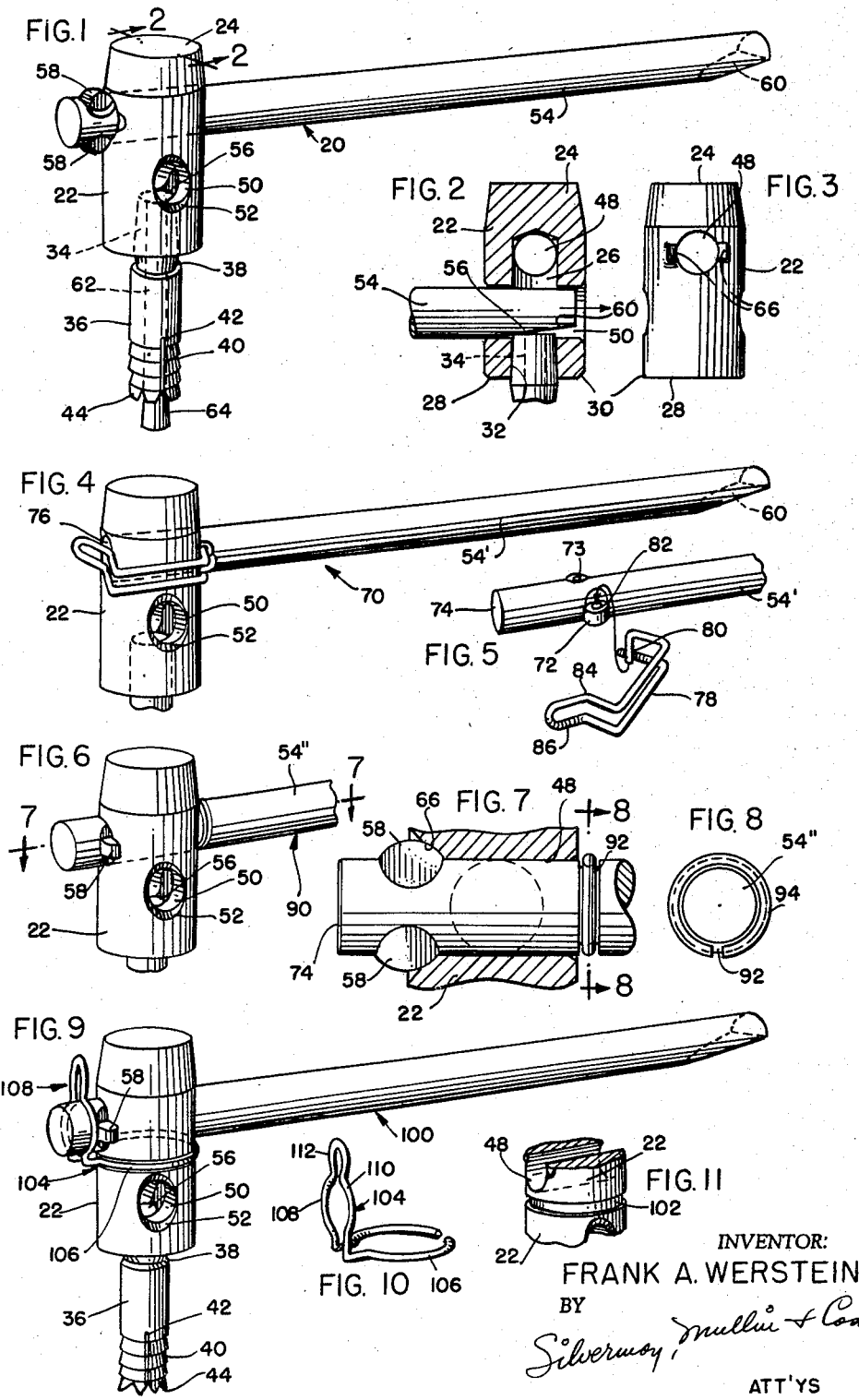

2,896,212
Patented July 28, 1959

2,896,212

CHUCK AND HANDLE FOR MANUAL INSTALLATION OF SELF-DRILLING EXPANSION SHELLS

Frank A. Werstein, Long Beach, Ind., assignor to Phillips Drill Company, Michigan City, Ind., a corporation of Illinois Application April 21, 1958, Serial No. 729,834

15 Claims. (Cl. 1—49.8)

This invention relates generally to tools for the installation of self-drilling expansion shells and more particularly is concerned with a chuck and handle for manually installing such shells.

The shells with which the invention is concerned comprise structures shown and described in such U.S. patents as 1,746,050, 1,786,029, 1,996,121 and the like. These shells may be described as comprising elongate cylindrical members each having hardened teeth formed at one axial end thereof, and a tapered frusto-conical formation at the opposite end thereof. The members are formed of steel and are bored throughout their centers axially, and the toothed end has axially extending fracture grooves cut in the wall thereof extending a substantial distance along the length commencing at the teeth. These fracture grooves are circumferentially spaced about the shell so as to enable the toothed end to uniformly split and spread when the shell is installed. The frusto-conical end is preferably separated from the remainder of the shell by a deep annular fracture groove to enable the said end to be broken off. The bore of the shell is threaded to receive a bolt of some standard size.

Shells of the construction described, and others of a similar nature have been used for many years past. The frusto-conical end is frictionally engaged in a complementary female socket provided in a chuck which in turn is mounted on a percussive hammer, either mechanically operated or electrically driven. The type of mechanical hammer used in the past is shown and described in U.S. Patent 1,484,845, and U.S. Patent 1,968,055 illustrates and describes the type of electrical hammer which has received extensive acceptance in the industry for installation of these shells.

The shells are for installation in concrete, masonry, brick and stone; to hang sprinkler systems, for mounting heavy machinery and other apparatus, and for securing beams, pipe, and the like. The shell is first driven directly into the concrete, for example, by repeated hammer blows while simultaneously turning the chuck back and forth axially to permit the teeth to cut a smooth hole. The cuttings and debris pass up the bore of the shell, through a hollow passageway provided in the chuck and out of a transverse passageway provided in the chuck. When the shell has drilled its own hole to a depth approximately at the point where the annular fracture groove is flush with the surface of the concrete, the shell is removed and the hole is cleaned out. A hardened steel tapered conical plug is inserted into the toothed end, and the shell returned to its self-drilled hole and hammered home. The tapered plug splits the toothed end into segments along the fracture lines and these bite into the walls of the hole, thereby expanding the innermost end of the shell permanently in the hole.

The chuck is then given a quick lateral movement and the frusto-conical end that is engaged in the socket of the chuck breaks off cleanly at the annular fracture line leaving the shell with its threaded entrance substantially flush with the surface of the masonry or concrete. The broken end now retained in the chuck is forced out by a suitable instrument, such as for example a rod having a flattened tapered side inserted into the transverse passageway previously mentioned as provided egress for debris and cuttings. Thereafter the chuck is ready for the next shell.

The chucks heretofore used have been required to have a handle secured thereto to enable the back and forth rotation or oscillation which must accompany the hammering of the shell into the concrete during the drilling process (no oscillation is required during the expansion process). Such handles have been formed of steel rod bent upon itself to form a loop and provided at the end opposite the loop with inwardly facing aligned extensions arranged transversely of the handle. These short extensions fit into the opposite ends of a second transverse passageway formed in the chuck substantially at right angles to the previously mentioned transverse passageway which is provided for the egress of debris and for the reception of the ejection tool. Obviously, the handle is capable of rotating the chuck and itself is swingable on an axis normal to the axis of the chuck.

Other types of shells have been known and used and many installed by means of different kinds of chucks, and such shells have included a construction in which the frusto-conical end is not used. Such shells have been formed with the simple cylindrical ends suitably drilled and tapped, and installation has been effected through the use of a chuck which includes a threaded stem or stud which is screwed into the bore of the shell. This is shown in U.S. Patent 1,244,992. The difficulty of using such shells and chucks has been that in order to prevent the shell from backing off the stud during the hammering process, instead of swinging the chuck back and forth it was necessary to rotate the chuck slowly in a single direction. Upon finally installing the shell, the stud had to be unscrewed.

These difficulties have been to some extent alleviated, insofar as these flush end shells are concerned, by structures which are shown and described in U.S. Patent 2,794,622, but another difficulty has been present in the installation of small size shells, especially, not previously solved until the advent of this invention.

It will be appreciated that the studs of extremely large chucks, say of a diameter of 3/4 inch and larger, might be made hollow, without great loss of strength. As for small sizes, say 1/2 inch diameter and less, the stud should be solid. Obviously, where the chuck was of the stud type and the shell the flush type, the difficulty of drilling was increased because the debris and cuttings had no egress, but were jammed into the center of the shell. Using such a shell and chuck necessitated continuous removal of the shell during the drilling process, to shake out the debris and cuttings, which often became so packed as to require hammering the shell to dislodge the same. In addition, it was common to have studs break off inside shells.

Until the advent of this invention, the only small sizes of shells which could be driven manually, for use for example by ordinary home craftsmen and the like, were of the so-called flush end variety. Because of the need for a stud-end, the chuck actually consisted of a large shank of steel of cylindrical or hexagonal cross-section, having a stud protruding from one end thereof. The chucks as known could not be used with the frusto-conical ended shells, because the operator was required to wield a hammer, to hold the chuck aligned with the place where the shell was to be installed, and to swing the chuck back and forth.

Because of the above-described reasons, the use of the shells above described has been limited to tradesmen who could afford to purchase the equipment needed to mechanically or electrically drive the shells for heavy duty installations. The widespread need for relatively small sizes for use in a much greater area of application was filled by relatively weak lead matrix fasteners, and by expensive and dangerous explosively driven fasteners.

It will be brought out by the description hereinafter that the invention has as its principal object the alleviation of the difficulties heretofore experienced in attempting to install small sizes of shells manually, and to supply the long-felt urgent need for a chuck which will enable the simple, speedy, economical, safe, and effective installation of self-drilling expansion shells of small sizes by inexperienced operators with the use of only a common hammer.

Many other objects of the invention will become apparent and these include the following:

(a) The provision of a chuck which will accept shells having the frusto-conical end formations of small size and will enable the same to be installed manually by means of a hammer;

(b) The provision of a chuck in which the handle comprises a single rod which provides sufficient support for the chuck while enabling the chuck with its shell to be manipulated, and which is provided with means on its end to eject the broken end of the shell after installation;

(c) The provision of a chuck in which the cuttings and debris will be driven out during the installation of the shell without the need for stopping with the drilling operation;

(d) The provision of a chuck with means to prevent the handle from rotating while the chuck is being used so that the chuck, handle and shell comprising substantially an assemblage which makes for quick and efficient installation;

(e) The provision of a chuck with means to prevent the handle from freely sliding out of the chuck during use, but which enables the handle to be disassociated from the chuck for using the ejector end thereof;

(f) The provision of chuck having novel resilient means for seating, holding, or preventing the removal of the handle from the chuck.

These and other objects of the invention as well as many advantages not specifically mentioned will become apparent to those skilled in this art as a complete and detailed explanation of the invention is set forth hereinafter, in connection with which there are illustrated in the drawing, several preferred embodiments of the invention, from an examination of which one may readily understand and appreciate the invention in all of its many aspects.

In the drawing, in which the same characters of reference will be used throughout the several figures thereof to designate the same or equivalent elements or structural parts:

Fig. 1 is a perspective view of a simple form of the invention, showing a chuck and handle arranged for use in driving a shell, a shell being shown secured within the bore of the chuck, and a conical expansion plug being shown positioned where it would normally be prior to driving the same home.

Fig. 2 is a median sectional view through the chuck of Fig. 1 taken generally on the vertical plane defined by the line 2—2 of Fig. 1 but showing how the flattened end of the handle is used to eject the broken frusto-conical end of the shell.

Fig. 3 is a side elevational view of a chuck of modified form, the same being similar in orientation to the chuck of Fig. 2.

Fig. 4 is a perspective view of a modified form of chuck and handle.

Fig. 5 is a fragmentary perspective view of the handle of the structure of Fig. 4 with a portion thereof separated from the handle to show the construction thereof.

Fig. 6 is a fragmentary perspective view of still another modified form of chuck and handle.

Fig. 7 is a sectional view taken generally along the line 7—7 of Fig. 6 and in the indicated direction.

Fig. 8 is a sectional transverse view taken generally on the line 8—8 of Fig. 7.

Fig. 9 is a perspective view of another modified form of chuck and handle constructed in accordance with the invention.

Fig. 10 is a perspective view of one of the parts of the structure illustrated in Fig. 9.

Fig. 11 is a fragmentary perspective view of a portion of the chuck of Fig. 9 showing the manner in which the part of Fig. 10 is installed.

The structures which are illustrated have generally the same basic construction, the variations being primarily in the means for securing the handle to the chuck. All are used in substantially the same manner to achieve the same excellent results. In describing these structures, it is desired to emphasize that the several features are interchangeable for the most part from embodiment to embodiment.

In Fig. 1 and Fig. 2 there is illustrated a structure which will be designated generally by the character 20, comprising a chuck and handle constructed in accordance with the invention. The chuck 22 is in the form of a cylindrical elongate member of steel, suitably heat-treated, either entirely, or selectively, to provide any desirable toughness or hardness characteristics. For example, the upper end 24, which is adapted to be struck by a hammer in using the chuck, may be softer than the remainder to prevent shock and possible cracking, this being a well-known technique, and not important to the invention. The upper end 24 is imperforate, and may be somewhat tapered to compensate for likelihood of spreading due to repeated hammering.

A vertical axial passageway 26 is bored up the center of the chuck 22 terminating short of the upper end 24 to provide sufficient hammering strength to constitute said upper end 24 as an impact head. The bottom end 28 is planar and the edges may be chamfered as at 30 to avoid sharp corners. The passageway 26, hereinafter called the axial bore, has its bottom end preferably tapered to form a socket at 32 to complementarily receive therein the frusto-conical end 34 of a self-drilling expansion shell 36, previously described hereinabove. The annular fracture groove of the shell can be seen at 38 in Fig. 1 and in Fig. 9, just below the frusto-conical end 34. The body of the shell 36 has the annular ridges 40 which assist during the drilling, and the axially extending fracture grooves are indicated at 42 terminating at the toothed end 44.

The chuck 22 has two transverse passageways 48 and 50, which are substantially at right angle to one another and both of which intersect the axis of the axial bore 26. The lower passageway 50 is required to intersect said axial bore 26, but the upper transverse passageway need not do so. The entrances of these passageways may be slightly countersunk as shown at 52 to eliminate burrs, and to assist in inserting the handle 54 therein. The dimensions of the axial bore 26, the tapered throat or socket portion 32, and the dimensional relationship of the same with the transverse passageway 50 are such that when a shell 36 is tightly engaged in the socket portion 32, the extreme end 56 of the frusto-conical portion 34 protrudes into the lower confines of the passageway 50 and in effect, intersects the same.

The handle 54 has stop means 58 formed at one end thereof, to prevent the handle from freely passing through its passageway 48. The handle may be in the form of a rod member of uniform diameter, and the stop means 58 may comprise a pin, projection, protuberance, or the like. In Fig. 1, the stop means comprise a pair of diametrically opposed lateral projections of generally semi-cylindrical configuration, formed simply by pinching the handle on opposite sides thereof in a die. The opposite end of the handle has a tapered flat portion 60 cut therein.

In use, with the chuck 22 and handle 54 arranged as shown in Fig. 1, the shell 36 is inserted into the socket portion 32 of the axial bore 26 and the handle 54 is held in one hand by the user, with the toothed end 44 engaged against the masonry or concrete. With a hammer held in his other hand, the user lightly taps the impact head 24 of the chuck and commences to swing the handle back and forth, about the axis of the bore 26. The shell 36 cuts its own hole, the debris and cuttings come up the bore 62 and thence enter the transverse passageway 50 and come out the ends thereof. After having penetrated to about the annular fracture groove 38, the chuck is lifted, pulling the shell 36 out with it, and the resulting hole cleaned. The tapered end plug 64 is then inserted into the toothed end 44 and the shell reinserted into its hole with the plug 64 at the bottom of the hole. The user drives the shell home by again hammering on the end 24 of the chuck 22, but this time without swinging the handle 54. The toothed end expands in the hole as explained. The user then strikes the side of the chuck 22 and the end 34 breaks off as shown in Fig. 2. The handle 54 is then withdrawn from the transverse passageway 48, and the flattened end 60 is inserted facing downward, into the passageway 50 from either side thereof. The wedging force applied by the flattened end 60 ejects the broken end 34, the handle 54 is replaced in its passageway 48, and the chuck and handle 20 are ready for use again.

In Fig. 3, there is illustrated a chuck 22 in which one end of the passageway 48 is enlarged by means of outwardly extending slots or cuts 66 formed, for example, by driving a relatively thick V-shaped cutting die into the end of the passageway. These slots 66 are designed to be matingly engaged by the stop means 58, enabling these stop means to seat into said slots 66 as best shown in Figs. 6 and 7 in another embodiment. In this manner, the chuck 22 can be more readily manipulated during installation of the shells, especially on walls or ceilings, where a freely rotatable handle will give some difficulties. Even in work on a horizontal surface, preventing the rotation of the handle 54 in its passageway 48, facilitates placing the shell in the proper location and holding it there until it has been started.

Figs. 4 and 5 illustrate a form of chuck and handle designated by the character 70 in which the chuck 22 is substantially the same as that shown in Figs. 1 and 2 or Fig. 3, but the handle is somewhat different. Here the handle 54' (to distinguish it from the handle 54) has a lateral projection 72 which is spaced from the free end 74 by a sufficient distance so that when said free end 74 is inserted into the transverse passageway 48, the handle will only enter a distance bringing the said end 74 slightly below the surface of the chuck 22, thereby forming a shallow recess indicated at 76 in Fig. 4. The projection 72 may be formed by a pinching operation similar to that forming the projections 58, and using the same tools, so that there may be two such projections on diametrically opposed sides. The pair of projections 72 and 73 serve as stop means to limit the axial insertion of the handle 54' and the projection 72 also serves another purpose. A generally U-shaped clamping member 78 has a pintle or hinge pin 80 formed thereon, the same being removably engaged in a perforation 82 provided in the projection 72. The particular clamping member 78 is shown formed of resilient wire, and is swingable about the projection 72. The distance across the U-shaped formation is somewhat less than the distance measured from the projection 72 to the diametrically opposite surface of the chuck 22. Thus the U-shaped member must be spread to cause it to engage the chuck, and the inwardly directed V-formation 84 provided by having an outwardly bent finger 86 on the free end of the U-shaped member 78 serves as a spring pressed latch. It rides over the surface of the chuck 22 and snaps into the shallow recess 76 thereby retaining the handle 54' and the chuck 22 in assembly, preventing not only twisting of the chuck 22 about the axis of the handle 54', but also preventing axial movement of the handle 54' in the passageway 48.

In the chuck and handle 70, after the hole has been drilled and the plug 64 installed and driven home, and the end 34 broken off, it is a simple matter to manually push back the U-shaped member, using the finger 86, to enable the handle 54' to be withdrawn and used as explained in connection with Fig. 2. The identical flattened portion 60 is provided.

Figs. 6, 7 and 8 illustrated another form of the invention embodied in the chuck and handle 90 in which means are provided on the handle 54" to prevent ready withdrawal or axial movement of the same during the use of the device. The chuck 22 is substantially the same as that of Fig. 3, and the handle 54" has an annular groove formed therein at 92 spaced from the stop means 58 by slightly more than the diameter of the chuck. A resilient split ring 94 is located in the groove. The ring resists movement of the handle 54" to the left as viewed in Fig. 7, thereby preventing the stop means or projections 58 from moving out of the slots 66. Thus the chuck 22 is retained against rotation relative to the handle 54" and also retained against movement in an axial direction relative to the handle 54". When it is desired to remove the handle 54" to use it for ejecting the broken-off piece 34, the handle may be forced to the left as in Fig. 7 through the passageway overcoming the resilience of the split ring 94. Obviously the groove 92 must be deep enough to permit this to be done.

Figs. 9, 10 and 11 illustrate still another form of the invention. In this construction, designated 100, the handle 54 and the chuck 22 are both substantially identical with those described. Preferably the structure of Fig. 3 is used in the chuck 22 to prevent twisting of the chuck relative to the handle 54. The chuck 22 of Figs. 9 and 11 differs further, from those described, in that it is provided with an annular groove 102 disposed between the passageways 48 and 50. A stop member 104 is mounted on this groove, and comprises an integral member preferably formed from resilient wire having an encircling horizontally arranged split circular portion 106 and a vertically arranged keyhole-shaped portion 108. The keyhole-shaped portion 108 has a large circular formation 110 which is aligned with the passageway 48 when the member 104 is in proper position, and the connected loop portion 112 is disposed above the larger circular portion.

The connected loop portion 112 is of such size as to pass one of the projections 58, and the larger circular formation 110 engages over the end of the handle 54 as shown in Fig. 9. The keyhole-shaped portion 108 is biased to press against the projections 58 tending to hold the same in their slots 66 thereby preventing rotation and axial movement of the handle 54. To remove the handle, the user pushes the same axially to the left as viewed in Fig. 9, until the projections 58 have cleared the slots, and then rotates the handle 54 through 90° aligning one of the projections 58 with the loop portion 112. The other projection is aligned with the open throat at the bottom of the formation 108, and hence the handle can be pushed out of its passageway 48. The reverse can be done in re-installing the handle, but it is just as convenient to align the projections 58 with the slots 66 and push the projections past the circular formation 110. Since the member 104 is formed of resilient wire the formation 110 will spread and ride over the projections 58 as this is done, and the handle literally snaps into position.

As previously mentioned, the various features which have been described are interchangeable and will result in structures constructed in accordance with the invention, and operating to enable the installation of the shells described manually. Likewise, the few modified forms are only exemplary, the invention being capable of wide variation within the purview of the invention as defined in the appended claims.

What it is desired to secure by Letters Patent of the United States is:

1. A combined chuck and handle for the manual installation of self-drilling expansion shells, which comprises, a chuck member having an axial bore including a shell-receiving socket opening to the bottom end thereof, an imperforate impact head formed at the end opposite said bottom, first and second transverse passageways through said chuck member having axes intersect the axis of said bore, said second passageway being closest to the bottom end, at least said second passageway physically intersecting said bore and providing communication with said socket for the discharge of cuttings from the interior of the chuck member, an elongate handle member slidingly engaged in said first passageway for holding said chuck during the use thereof, and there being stop means on the one end of the handle to limit the extent of sliding movement thereof in said first passageway.

2. A combined chuck and handle as claimed in claim 1 in which said handle has ejector means formed at the second end thereof, and the second passageway is of substantially the same diameter as the first passageway, whereby said handle may be removed from the first passageway and inserted, ejector means first, into said second passageway for ejecting the shell from the socket.

3. A combined chuck and handle for the installation of self-drilling expansion shells, which comprises, a chuck member having a shell receiving socket on its bottom end, an impact head on its top end, a transverse passageway whose axis intersects the vertical axis of the chuck member, an elongate rod slidably engaged in the passageway, said chuck member having means for discharging cuttings passing into the interior of the chuck member through said shell without removing said rod during the driving of said shells, and one end of said rod and one end of said passageway having means cooperating to prevent axial sliding of the rod in said passageway in at least one direction and also preventing rotation of said rod relative said chuck member about the rod axis.

4. A combined chuck and handle as claimed in claim 3 in which said last mentioned means comprise lateral projections formed on said one end of said rod, and mating lateral slots formed on said one end of said passageway.

5. A combined chuck and handle for the installation of self-drilling expansion shells, which comprises a chuck member having a shell receiving socket on its bottom end, an impact head on its top end, a transverse passageway whose axis intersects the vertical axis of the chuck member, an elongate rod removably and slidably engaged in the passageway, said chuck member having means for discharging cuttings passing into the interior of the chuck member through said shell without removing said rod during the driving of said shells, the rod adapted to be disposed with one end engaged in said passageway and the major portion of said rod protruding from said passageway to provide a handle, the said rod and chuck having means cooperating to retain the said rod in said disposition to oppose longitudinal and rotational movement of said rod during use of said chuck and handle.

6. A combined chuck and handle as claimed in claim 5 in which said last mentioned means includes at least one lateral projection on said one end of said rod, and a slot formed in said chuck member matingly to receive said projection.

7. A tool for driving self-drilling expansion shells, and comprising a generally cylindrical chuck member having a shell-accommodating socket in the bottom end thereof, an impact head formed at the top thereof, a transverse passageway therein, a rod member forming a handle for use of said tool and adapted to be removably engaged in said transverse passageway at one end of said rod member, first stop means on the rod member to prevent axial sliding movement of the rod member in one direction, and said tool having spring biased releasable stop means to prevent axial sliding movement of said rod in the opposite direction, both of said stop means engaging the chuck adjacent opposite ends of the transverse passageway.

8. A tool for driving self-drilling expansion shells, and comprising a generally cylindrical chuck member having a shell-accommodating socket in the bottom end thereof, an impact head formed at the top thereof, a transverse passageway therein, a rod member forming a handle for use of said tool and adapted to be removably engaged in said transverse passageway at one end of said rod member, first stop means on the rod member to prevent axial sliding movement of the rod member in one direction, and said tool having releasable stop means to prevent axial sliding movement of said rod in the opposite direction, said releasable stop means comprising a resilient ring mounted on said rod member spaced from said one end of the rod member and opposing sliding movement of said rod member in a direction which would normally carry said ring into said passageway.

9. A tool for driving self-drilling expansion shells, and comprising a generally cylindrical chuck member having a shell-accommodating socket in the bottom end thereof, an impact head formed at the top thereof, a transverse passageway therein, a rod member forming a handle for use of said tool and adapted to be removably engaged in said transverse passageway at one end of said rod member, first stop means on the rod member to prevent axial sliding movement of the rod member in one direction, and said tool having releasable stop means to prevent axial sliding movement of said rod in the opposite direction, said releasable stop means comprising a latch device mounted on said rod member and swingable to engage said chuck member when said rod member is engaged in said passageway as aforesaid to form a handle.

10. A tool for driving self-drilling expansion shells, and comprising a generally cylindrical chuck member having a shell-accommodating socket in the bottom end thereof, an impact head formed at the top thereof, a transverse passageway therein, a rod member forming a handle for use of said tool and adapted to be removably engaged in said transverse passageway at one end of said rod member, first stop means on the rod member to prevent axial sliding movement of the rod member in one direction, and said tool having releasable stop means to prevent axial sliding movement of said rod in the opposite direction, said first stop means comprising at least one projection on said rod member spaced from the end thereof whereby to enable a short length of said rod member to be inserted a limited distance into said passageway from one end thereof, and said releasable stop means comprises a swingable resilient latch secured to said rod member substantially at said projection and adapted to engage said chuck member on the side opposite said one end of said passageway in which said rod member is inserted.

11. A tool for driving self drilling expansion shells, and comprising a generally cylindrical chuck member having a shell receiving socket in the bottom end thereof, an impact head formed on the top thereof, said chuck member having means communicating with said socket and opening to at least one side of said chuck member to enable debris and cuttings to be discharged from said socket while said tool is being used to drill a hole, and a transverse passageway in said chuck member intersecting the vertical axis thereof, an elongate handle member slidably and removably engaged in said passageway and having at least one lateral projection adjacent one end thereof, the passageway having at least one lateral recess formed therein at one end thereof and having entrances at said end whereby said handle member may be slid into said passageway in one direction until its projection engages in said lateral recess, after which further movement of said handle member in said one direction is prevented.

12. A tool as claimed in claim 11 in which means are provided to prevent slidable movement of said handle member in a direction opposite to said one direction.

13. A tool as claimed in claim 11 in which means are provided to prevent slidable movement of said handle member in a direction opposite to said one direction, comprising a stop member secured to said handle at a point spaced from said projection by substantially the diameter of said chuck whereby to engage against said chuck at the second end of said passageway.

14. A tool as claimed in claim 11 in which means are provided to prevent slidable movement of said handle member in a direction opposite to said one direction, comprising a resilient member secured to said chuck and having a part disposed in the path of said projection on the side thereof axially opposite the chuck.

15. A tool as claimed in claim 14 in which said resilient member includes a split ring encircling the chuck member and said part comprises a connected portion arranged at right angle to said split ring and at right angle to the axis of said handle member, said connected portion having a large circular formation freely passing said handle member, but not said projection and smaller connected formations passing said projection but the smaller formations being disposed at a different circumferential location than said lateral recess whereby the handle must be first moved out of said recess and then rotated to pass said resilient member.

References Cited in the file of this patent

UNITED STATES PATENTS 2,829,898     Tilden _____ Apr. 8, 1958